US008065654B2

(12) United States Patent
Shiihara et al.

(10) Patent No.: US 8,065,654 B2
(45) Date of Patent: Nov. 22, 2011

(54) COMPUTER AIDED DESIGN SYSTEM FOR NARROWING A LIST OF CANDIDATE CIRCUITS BASED ON A CIRCUIT SEARCH-RANGE NARROWING CONDITION

(75) Inventors: Hidenobu Shiihara, Kawasaki (JP); Yasuhiro Yamashita, Kawasaki (JP); Mitsunobu Okano, Kawasaki (JP); Takashi Fukuda, Oyama (JP)

(73) Assignee: Fujitsu Limited, Kawasaki (JP)

( * ) Notice: Subject to any disclaimer, the term of this patent is extended or adjusted under 35 U.S.C. 154(b) by 380 days.

(21) Appl. No.: 12/261,444

(22) Filed: Oct. 30, 2008

(65) Prior Publication Data

US 2009/0125507 A1 May 14, 2009

(30) Foreign Application Priority Data

Nov. 9, 2007 (JP) ................................ 2007-292530

(51) Int. Cl.
*G06F 17/50* (2006.01)

(52) U.S. Cl. ......... 716/139; 716/118; 716/126; 700/107

(58) Field of Classification Search .................. 716/118, 716/126, 139; 700/107
See application file for complete search history.

(56) References Cited

U.S. PATENT DOCUMENTS

| | | | | |
|---|---|---|---|---|
| 5,339,247 | A * | 8/1994 | Kirihara et al. | 700/106 |
| 5,519,630 | A * | 5/1996 | Nishiyama et al. | 716/102 |
| 5,745,371 | A * | 4/1998 | Shouen | 716/102 |
| 5,856,925 | A * | 1/1999 | Maeda et al. | 716/102 |
| 6,289,254 | B1 * | 9/2001 | Shimizu et al. | 700/96 |
| 6,834,380 | B2 * | 12/2004 | Khazei | 716/115 |
| 7,103,434 | B2 * | 9/2006 | Chernyak et al. | 700/98 |
| 7,441,219 | B2 * | 10/2008 | Perry et al. | 716/118 |
| 7,680,644 | B2 * | 3/2010 | Rappaport et al. | 703/21 |
| 7,712,058 | B2 * | 5/2010 | Brathwaite et al. | 716/106 |

FOREIGN PATENT DOCUMENTS

| | | |
|---|---|---|
| JP | 05-120375 | 5/1993 |
| JP | 07254002 A * | 10/1995 |
| JP | 2001-134631 | 5/2001 |
| JP | 2002-108964 | 4/2002 |

OTHER PUBLICATIONS

Change of Name for Japanese Laid-Open Patent Publication No. 2001-134631 (REF AG).

* cited by examiner

*Primary Examiner* — Naum Levin
(74) *Attorney, Agent, or Firm* — Staas & Halsey LLP

(57) ABSTRACT

A computer aided design system is provided that includes a display, an input unit for inputting a circuit search-range narrowing condition, and a processing unit for, when a circuit topology of a circuit to be designed is changed, finding recommended circuits by searching a database, which stores part data and circuit data, based on the circuit search-range narrowing condition, and displaying a list of the recommended circuits on the display.

14 Claims, 15 Drawing Sheets

11 PART DATABASE
12 ACTUAL CIRCUIT DATABASE
13 UNDER-STUDY CIRCUIT DATABASE
USER
21 CIRCUIT SEARCH-RANGE NARROWING CONDITION
22 CIRCUIT TOPOLOGY OF CURRENT CIRCUIT
S1 SEARCH FOR RECOMMENDED CIRCUIT
30 RECOMMENDED CIRCUIT LIST
· xxxxxx
· yyyyyy DV1
CY2308SC-1H
ICY2308SC-1H001_Typ
A2
3
N1
SEG7
10mm
Z: 50ohm
N8
R1
22ohm
N9
SEG1
140mm
Z: 50ohm
N5
SEG4
10mm
Z: 50ohm
N2
RV1
SEG3
5mm
Z: 50ohm
N4
SEG2
20mm
Z: 50ohm
N3
RV2
SEG6
5mm
Z: 50ohm
N7
SEG5
25mm
Z: 50ohm
N6
RV3

| | PART A | PART B | PART C | PART D |
|---|---|---|---|---|
| DRIVE CAPABILITY | 130mA | 130mA | 110mA | 90mA |
| OUTPUT IMPEDANCE | 5 ohm | 6 ohm | 10 ohm | 12 ohm |
| tr/tf | 0.1 ns/0.1 ns | 0.1 ns/0.1 ns | 0.4 ns/0.3 ns | 0.5 ns/0.5 ns |

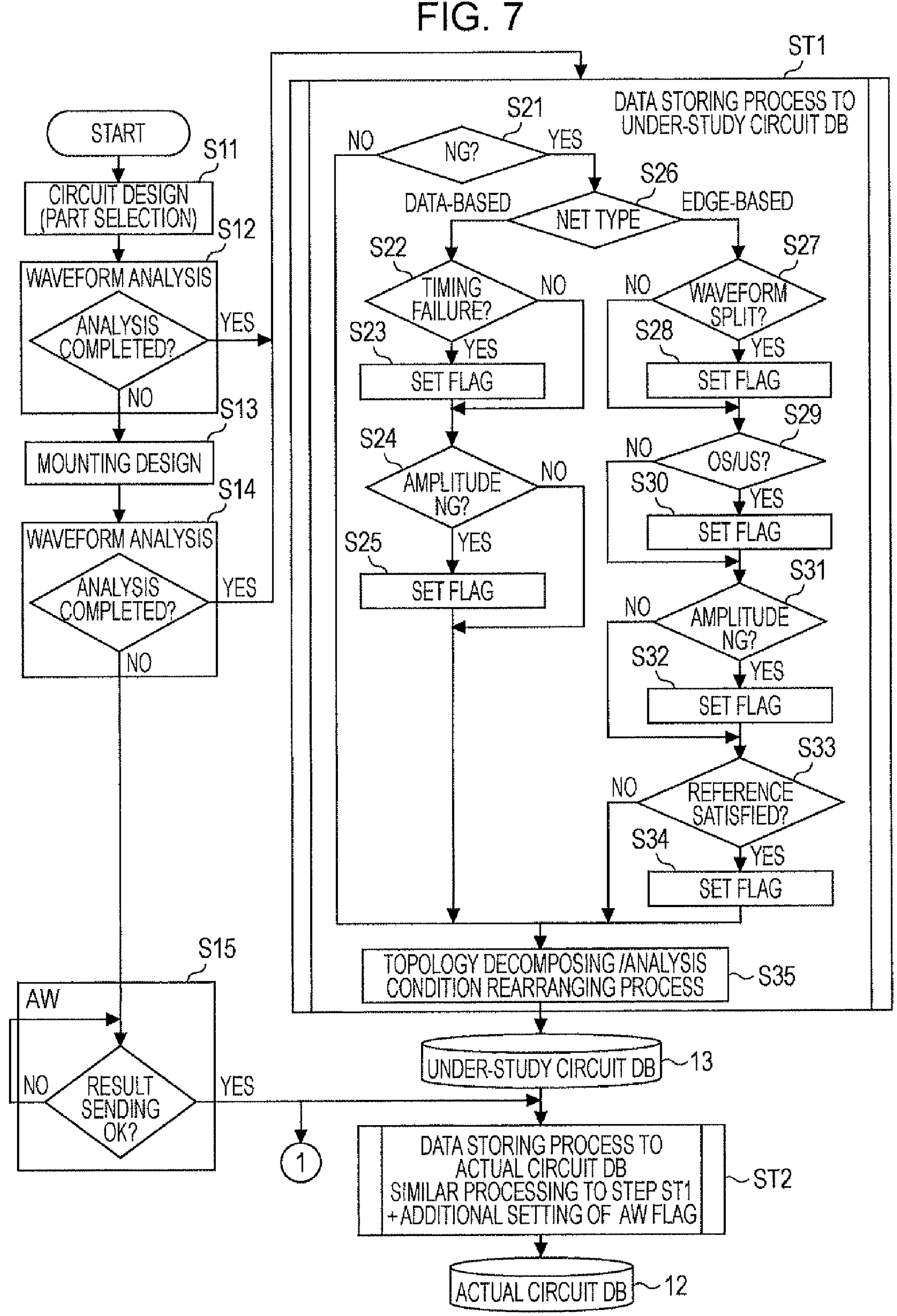

FIG. 7
START
S11
CIRCUIT DESIGN (PART SELECTION)
S12
WAVEFORM ANALYSIS
ANALYSIS COMPLETED?
YES
NO
S13
MOUNTING DESIGN
S14
WAVEFORM ANALYSIS
ANALYSIS COMPLETED?
YES
NO
S15
AW
RESULT SENDING OK?
NO
YES
1
ST1
DATA STORING PROCESS TO UNDER-STUDY CIRCUIT DB
S21
NG?
NO
YES
S26
NET TYPE
DATA-BASED
EDGE-BASED
S22
TIMING FAILURE?
NO
S23
YES
SET FLAG
S24
AMPLITUDE NG?
NO
S25
YES
SET FLAG
S27
WAVEFORM SPLIT?
NO
S28
YES
SET FLAG
S29
OS/US?
NO
S30
YES
SET FLAG
S31
AMPLITUDE NG?
NO
S32
YES
SET FLAG
S33
REFERENCE SATISFIED?
NO
S34
YES
SET FLAG
TOPOLOGY DECOMPOSING /ANALYSIS CONDITION REARRANGING PROCESS
S35
UNDER-STUDY CIRCUIT DB
13
DATA STORING PROCESS TO ACTUAL CIRCUIT DB SIMILAR PROCESSING TO STEP ST1 +ADDITIONAL SETTING OF AW FLAG
ST2
ACTUAL CIRCUIT DB
12

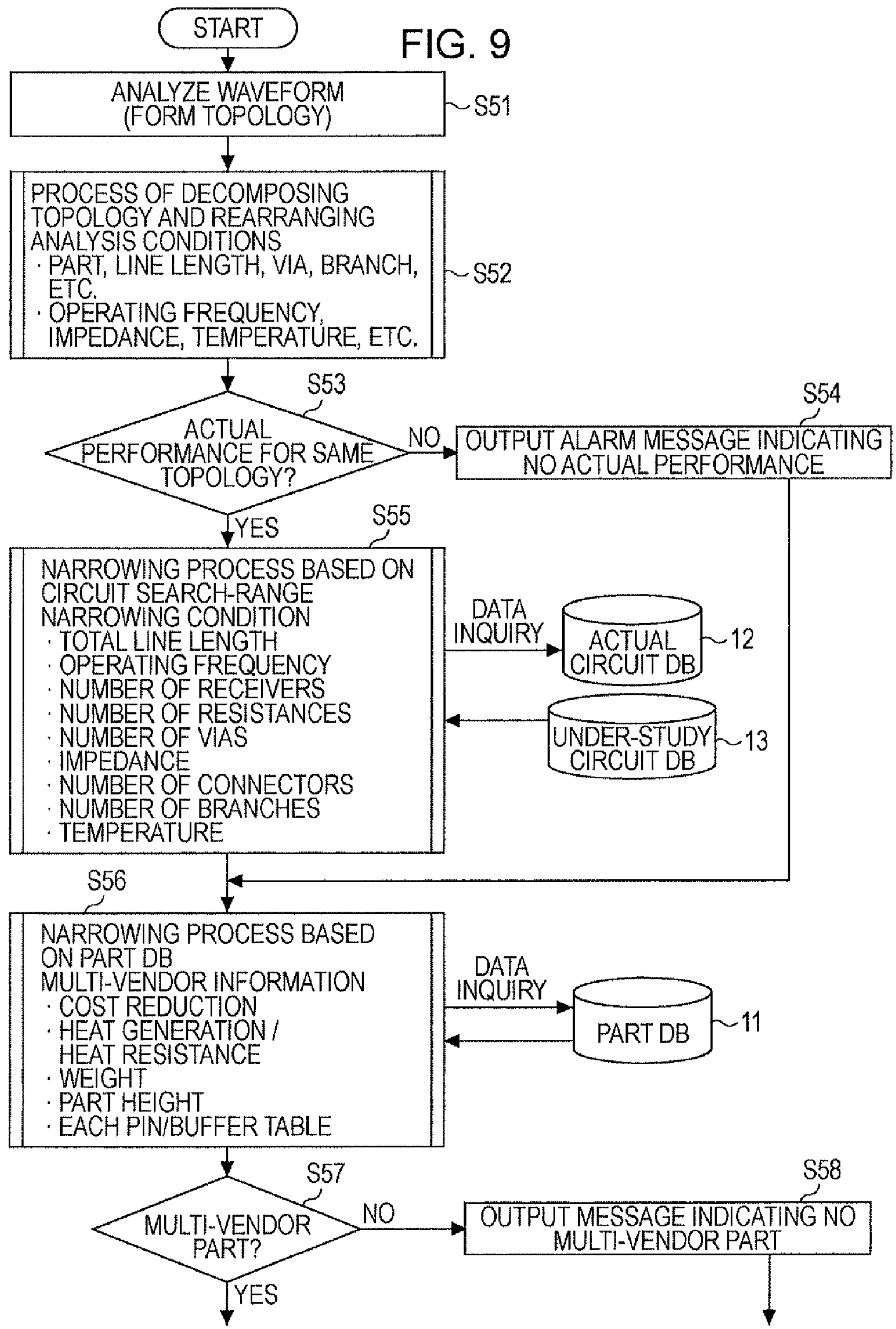
START
FIG. 9
ANALYZE WAVEFORM (FORM TOPOLOGY)
S51
PROCESS OF DECOMPOSING TOPOLOGY AND REARRANGING ANALYSIS CONDITIONS
· PART, LINE LENGTH, VIA, BRANCH, ETC.
· OPERATING FREQUENCY, IMPEDANCE, TEMPERATURE, ETC.
S52
S53
ACTUAL PERFORMANCE FOR SAME TOPOLOGY?
NO
S54
OUTPUT ALARM MESSAGE INDICATING NO ACTUAL PERFORMANCE
YES
S55
NARROWING PROCESS BASED ON CIRCUIT SEARCH-RANGE NARROWING CONDITION
· TOTAL LINE LENGTH
· OPERATING FREQUENCY
· NUMBER OF RECEIVERS
· NUMBER OF RESISTANCES
· NUMBER OF VIAS
· IMPEDANCE
· NUMBER OF CONNECTORS
· NUMBER OF BRANCHES
· TEMPERATURE
DATA INQUIRY
ACTUAL CIRCUIT DB
12
UNDER-STUDY CIRCUIT DB
13
S56
NARROWING PROCESS BASED ON PART DB MULTI-VENDOR INFORMATION
· COST REDUCTION
· HEAT GENERATION / HEAT RESISTANCE
· WEIGHT
· PART HEIGHT
· EACH PIN/BUFFER TABLE
DATA INQUIRY
PART DB
11
S57
MULTI-VENDOR PART?
NO
S58
OUTPUT MESSAGE INDICATING NO MULTI-VENDOR PART
YES

| REPRESENTATIVE SPECIFICATION NAME | XXXX | XXXX | XXXX | XXXX |
|---|---|---|---|---|
| MAKER MODEL NAME | AAA | BBB | CCC | DDD |
| MAKER PRODUCT NAME | CLOCK DRIVER | CLOCK DRIVER | CLOCK DRIVER | CLOCK DRIVER |
| NUMBER OF PINS | 64 | 64 | 64 | 64 |
| PART RANK | A | B | A | C |
| FAILURE RATE | 50 | 80 | 50 | 100 |
| RoHS | 1 | 1 | 1 | 1 |
| HEAT RESISTANCE RANK | B | B | B | B |
| PRICE | 100 | 200 | 100 | 150 |
| HEAT GENERATION RANK | A | B | A | B |
| PACKAGE SHAPE | PSD012 | PSD010 | PSD011 | PSD010 |
| PART HEIGHT | 1.2 | 1.0 | 1.1 | 1.0 |
| OPERATING LIFE | 10 YEARS | 10 YEARS | 10 YEARS | 10 YEARS |
| PART WEIGHT | 200 | 210 | 180 | 200 |
| MOISTURE ABSORPTION CONTROL | AA | BB | AA | BB |
| | | | | |

| PIN NUMBER | 1 PIN | 2 PIN | 3 PIN | 4 PIN |
|---|---|---|---|---|
| BUFFER NAME | Output1 | Output2 | Output3 | Input1 |
| PKG CAPACITY | 0.1mΩ,3nH,2pF | 0.1mΩ,3nH,2pF | 0.1mΩ,3nH,2pF | 0.1mΩ,3nH,2pF |

| BUFFER NAME | Output1 | Output2 | Output3 | Input1 |
|---|---|---|---|---|
| DRIVE CAPABILITY | 130mA | 130mA | 110mA | |
| OUTPUT IMPEDANCE | 5 ohm | 6 ohm | 10 ohm | |
| tr/tf | 0.1 ns/0.1 ns | 0.1 ns/0.1 ns | 0.4 ns/0.3 ns | |
| INPUT CLAMP | GND/PWR | GND/PWR | GND/PWR | GND/PWR |
| | | | | |

| BUFFER NAME | Output1 | Output2 | Output3 | Input1 |
|---|---|---|---|---|
| PIN NUMBER | 1 | 2 | 3 | 4 |
| DRIVE CAPABILITY | 90mA | 90mA | 80mA | |
| OUTPUT IMPEDANCE | 20 ohm | 25 ohm | 30 ohm | |
| tr/tf | 0.15 ns/0.1 ns | 0.15 ns/0.1 ns | 0.4 ns/0.3 ns | |
| INPUT CLAMP | GND/PWR | GND/PWR | GND/PWR | GND/PWR |
| Ccomp | | | | 5pF |

| BUFFER NAME | Output1 | Output2 | Output3 | Input1 |
|---|---|---|---|---|
| PIN NUMBER | 1 | 2 | 3 | 4 |
| DRIVE CAPABILITY | 130mA | 130mA | 110mA | |
| OUTPUT IMPEDANCE | 5 ohm | 7 ohm | 10 ohm | |
| tr/tf | 0.1 ns/0.1 ns | 0.1 ns/0.1 ns | 0.4 ns/0.3 ns | |
| INPUT CLAMP | GND/PWR | GND/PWR | GND/PWR | GND/PWR |
| Ccomp | | | | 5pF |

| BUFFER NAME | Output1 | Output2 | Output3 | Input1 |
|---|---|---|---|---|
| PIN NUMBER | 1 | 2 | 3 | 4 |
| DRIVE CAPABILITY | 100mA | 100mA | 900mA | |
| OUTPUT IMPEDANCE | 10 ohm | 10 ohm | 20 ohm | |
| tr/tf | 0.15 ns/0.1 ns | 0.15 ns/0.1 ns | 0.4 ns/0.3 ns | |
| INPUT CLAMP | GND/PWR | GND/PWR | GND/PWR | GND/PWR |
| Ccomp | | | | 5pF |

| BUFFER NAME | Output1 | Output2 | Output3 | Input1 |
|---|---|---|---|---|
| PIN NUMBER | 1 | 2 | 3 | 4 |
| DRIVE CAPABILITY | 85mA | 85mA | 80mA | |
| OUTPUT IMPEDANCE | 20 ohm | 30 ohm | 35 ohm | |
| tr/tf | 0.2 ns/0.1 ns | 0.15 ns/0.1 ns | 0.4 ns/0.3 ns | |
| INPUT CLAMP | GND/PWR | GND/PWR | GND/PWR | GND/PWR |
| Ccomp | | | | 5pF |

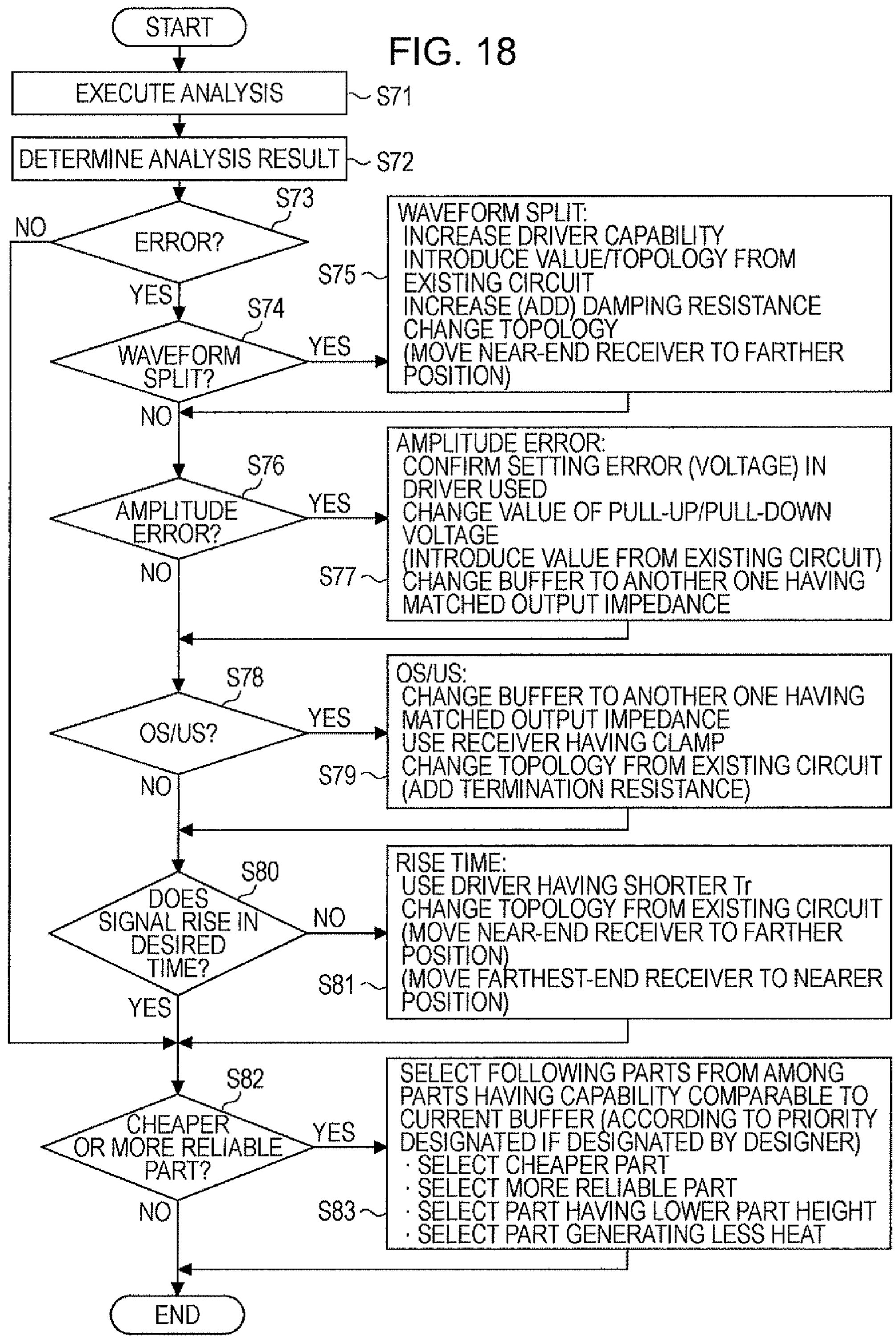
FIG. 18
START
EXECUTE ANALYSIS
S71
DETERMINE ANALYSIS RESULT
S72
S73
ERROR?
NO
YES
S74
WAVEFORM SPLIT?
YES
NO
S75
WAVEFORM SPLIT:
INCREASE DRIVER CAPABILITY
INTRODUCE VALUE/TOPOLOGY FROM EXISTING CIRCUIT
INCREASE (ADD) DAMPING RESISTANCE
CHANGE TOPOLOGY
(MOVE NEAR-END RECEIVER TO FARTHER POSITION)
S76
AMPLITUDE ERROR?
YES
NO
S77
AMPLITUDE ERROR:
CONFIRM SETTING ERROR (VOLTAGE) IN DRIVER USED
CHANGE VALUE OF PULL-UP/PULL-DOWN VOLTAGE
(INTRODUCE VALUE FROM EXISTING CIRCUIT)
CHANGE BUFFER TO ANOTHER ONE HAVING MATCHED OUTPUT IMPEDANCE
S78
OS/US?
YES
NO
S79
OS/US:
CHANGE BUFFER TO ANOTHER ONE HAVING MATCHED OUTPUT IMPEDANCE
USE RECEIVER HAVING CLAMP
CHANGE TOPOLOGY FROM EXISTING CIRCUIT
(ADD TERMINATION RESISTANCE)
S80
DOES SIGNAL RISE IN DESIRED TIME?
NO
YES
S81
RISE TIME:
USE DRIVER HAVING SHORTER Tr
CHANGE TOPOLOGY FROM EXISTING CIRCUIT
(MOVE NEAR-END RECEIVER TO FARTHER POSITION)
(MOVE FARTHEST-END RECEIVER TO NEARER POSITION)
S82
CHEAPER OR MORE RELIABLE PART?
YES
NO
S83
SELECT FOLLOWING PARTS FROM AMONG PARTS HAVING CAPABILITY COMPARABLE TO CURRENT BUFFER (ACCORDING TO PRIORITY DESIGNATED IF DESIGNATED BY DESIGNER)
· SELECT CHEAPER PART
· SELECT MORE RELIABLE PART
· SELECT PART HAVING LOWER PART HEIGHT
· SELECT PART GENERATING LESS HEAT
END

COMPUTER AIDED DESIGN SYSTEM FOR NARROWING A LIST OF CANDIDATE CIRCUITS BASED ON A CIRCUIT SEARCH-RANGE NARROWING CONDITION

CROSS-REFERENCE TO RELATED APPLICATIONS

This application is related to and claims priority to Japanese Patent Application No. 2007-292530 filed on Nov. 9, 2007, and incorporated by reference herein.

BACKGROUND

1. Field

The embodiments discussed herein are directed to a CAD (Computer Aided Design) system and program for, when a design change is performed in design of circuits such as an integrated circuit and a circuit board, narrowing a list of candidate circuits based on a circuit search-range narrowing condition.

2. Description of the Related Art

A CAD system is utilized in the fields of circuit design, etc. Conventionally, circuit design, for example, is performed by utilizing the CAD system, signal waveforms obtained at various points on a designed circuit are analyzed per circuit, per substrate on which the circuit is mounted, or per device including the circuit, and the presence of a problem or an unsatisfactory situation is determined based on the analysis result. Also, if the presence of a problem is determined based on the analysis result, the CAD system outputs an advice regarding revision of the circuit design. After the circuit design is revised, signal waveforms are analyzed again.

I Conventionally, CAD systems, however, even when the same or similar circuit design, for example, has been performed in the past, do not assist the circuit design by positively utilizing data regarding the past circuit design when new circuit design is performed. Thus, conventionally CAD systems have a problem that the circuit design cannot be performed in a manner enabling the data regarding the past circuit design to be effectively utilized.

SUMMARY

It is an aspect of an embodiment discussed herein to provide a computer aided design system includes a display, an input unit for inputting a circuit search-range narrowing condition, and a processing unit for, when a circuit topology of a circuit to be designed is changed, finding recommended circuits by searching a database, which stores part data and circuit data, based on the circuit search-range narrowing condition, and displaying a list of the recommended circuits on the display.

These together with other aspects and advantages which will be subsequently apparent, reside in the details of construction and operation as more fully hereinafter described and claimed, reference being had to the accompanying drawings forming a part hereof wherein like numerals refer to like parts throughout.

BRIEF DESCRIPTION OF THE DRAWINGS

FIG. 6 illustrates an exemplary buffer table;

FIG. 7 illustrates a data registering process;

FIG. 9 illustrates a circuit design process including a data referring process;

FIG. 11 illustrates an exemplary part table;

FIG. 12 illustrates an exemplary part pin table;

FIG. 13 illustrates an exemplary part buffer table;

FIG. 14 illustrates an exemplary buffer table for the maker model name CCC;

FIG. 15 illustrates an exemplary buffer table for the maker model name AAA;

FIG. 16 illustrates an exemplary buffer table for the maker model name BBB;

FIG. 17 illustrates an exemplary buffer table for the maker model name DDD; and FIG. 18 illustrates processing executed on an analysis result.

DETAILED DESCRIPTION OF THE EMBODIMENTS

Figure 1:
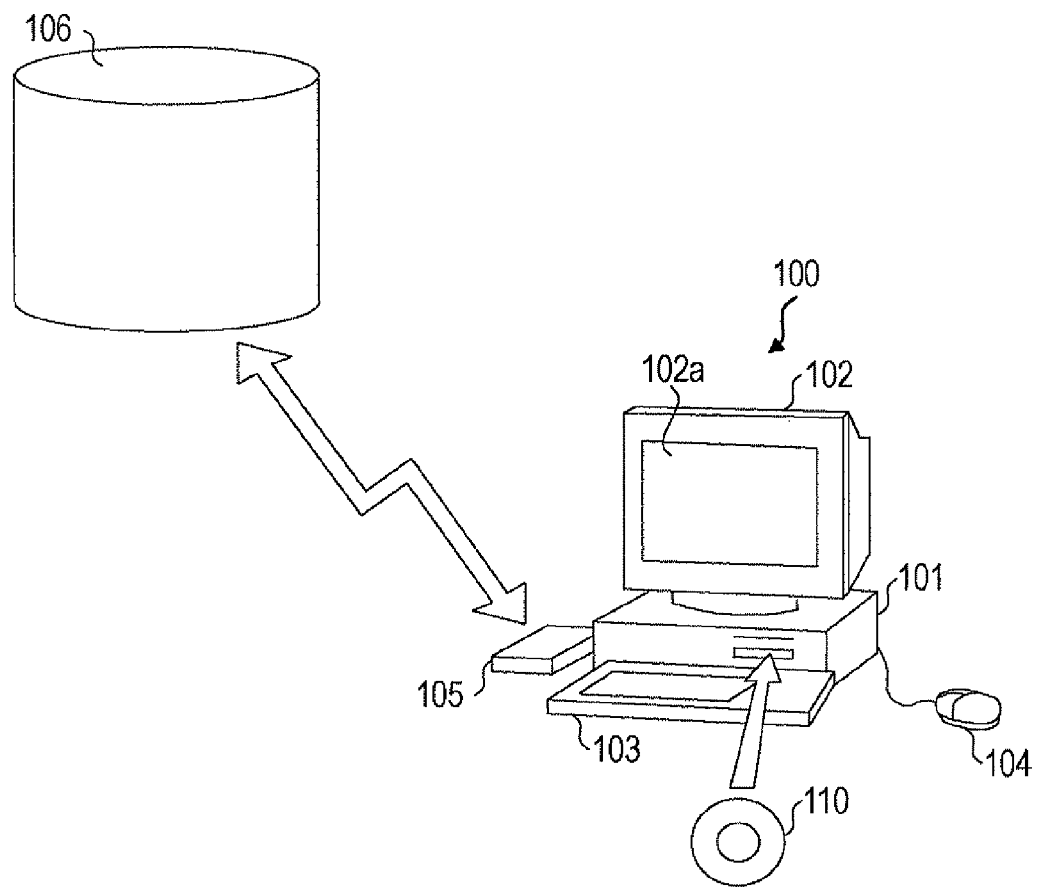
FIG. 1 illustrates a computer system of an exemplary embodiment.

FIG. 1 illustrates a computer system according to an exemplary embodiment. A computer system 100, shown in FIG. 1, comprises a main unit 101 including a CPU, a disk drive, etc., a display 102 for displaying data regarding circuit design, such as a circuit model and an analysis result, on a display screen 102*a* in response to an instruction from the main unit 101, a keyboard 103 for inputting various kinds of information to the computer system 100, a mouse 104 for designating a desired position on the display screen 102*a* of the display 102, and a modem 105 for accessing an external database (DB), etc. and for downloading a program, etc. stored in another computer system.

A program (CAD software) capable of giving at least the CAD function to the computer system 100 may be stored in a portable recording medium, e.g., a disk 110, or downloaded from a recording medium 106 in another computer system by using a communication device, e.g., the modem 105, and it is input to and compiled in the computer system 100. The program causes the computer system 100 (specifically, a CPU 201 described later) to function as a CAD system (or a simulation system). The program can be stored in a computer readable recording medium, e.g., the disk 110. The computer readable recording medium is not limited to a portable recording medium, e.g., the disk 110, an IC card memory, a magnetic disk such as a Floppy (registered trademark) disk, a magneto-optical disk, or a CD-ROM, and it also includes other various types of recording media which can be connected through a communication device or another method of communications, such as the modem 105 or a LAN, and can be accessed by the computer system.

Figure 2:
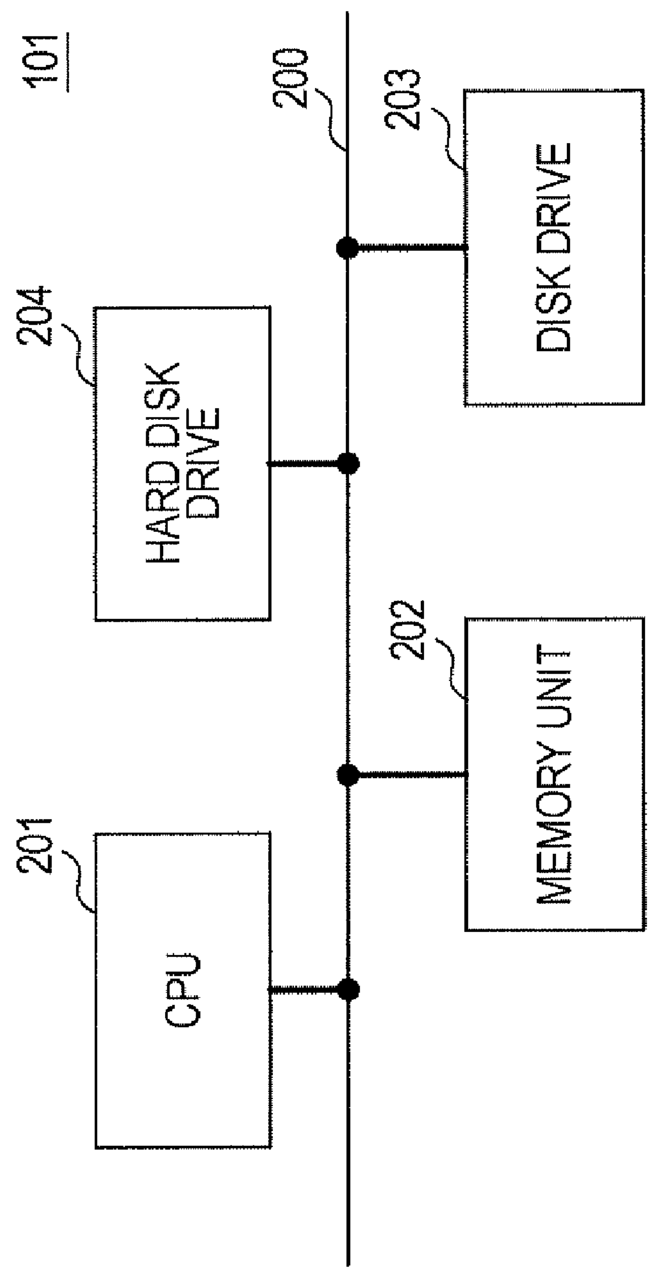
FIG. 2 illustrates an exemplary main unit of the computer system.

FIG. 2 illustrates a principal configuration inside the main unit 101 of the computer system 100. Referring to FIG. 2, the main unit 101 comprises a CPU 201, a memory unit 202, including a RAM and a ROM, a disk drive 203 for the disk 110, and a hard disk drive (HDD) 204, those components being interconnected via a bus 200. While the display 102, the keyboard 103 and the mouse 104 are also connected to the CPU 201 via the bus 200 in one example, they may be directly connected to the CPU 201. Further, the display 102 may be connected to the CPU 201 through a well-known graphic interface (not shown) for processing input/output image data.

Note that the configuration of the computer system 100 is not limited to those shown in FIGS. 1 and 2, and other suitable configurations may be used instead.

Figure 3:
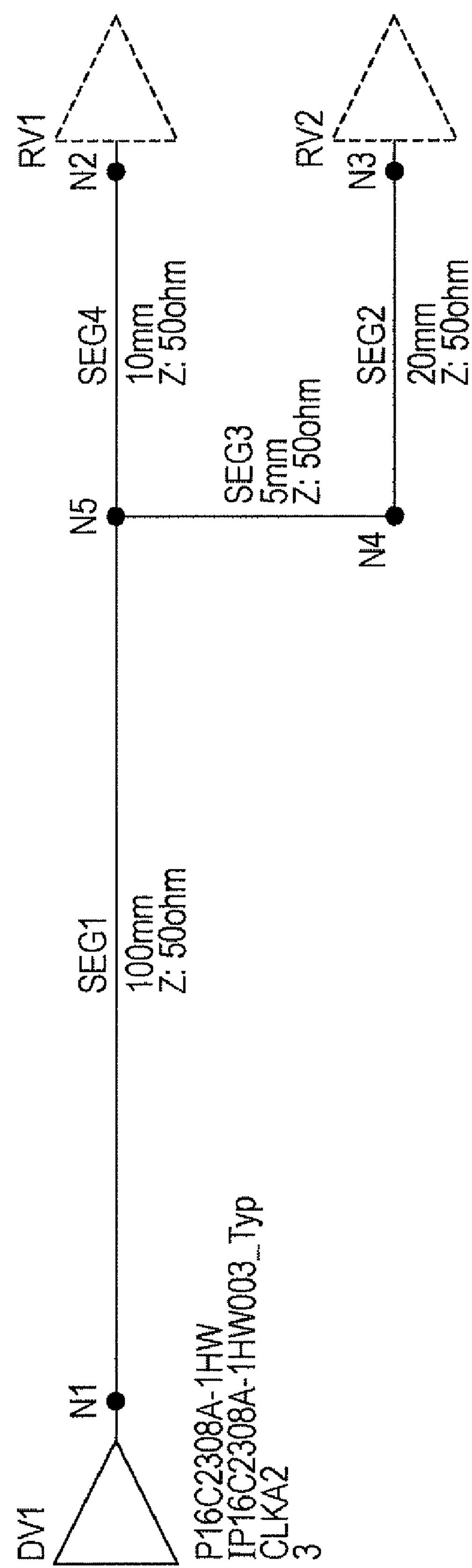
FIG. 3 illustrates an exemplary circuit topology of a current circuit.

A CAD process will be first described. For the sake of convenience, the following description is made in connection with the case of circuit design (circuit change herein) in which a current circuit having a circuit configuration (i.e., a circuit topology), shown in FIG. 3, is realized by using other parts (or other devices). In FIG. 3, DV1 denotes a driver, RV1 and RV2 denote receivers, N1 to N6 denote nodes, and SEG1 to SEG4 denote wiring segments. Below each part, there are listed exemplary part specifics, i.e., the performance, the wiring length, the impedance Z, etc. of the part. Note that, in FIG. 3, circuit topology data of the receivers RV1 and RV2 are not shown. The circuit topology data is not limited to that shown in FIG. 3, and the total line length, the presence or absence of a damping or termination resistance, the presence or absence of an AC coupling capacitor, the topology form type (e.g., daisy chain or star), etc. can also be designated by using numerals, for example.

The circuit topology of the current circuit, shown in FIG. 3, is stored, for example, in an actual circuit database 12, shown in FIG. 4, in the following format:

part symbol information

[BLOCK]: DV1:X=1520, Y=1648, DIR=0, SYMNAME=DRIVER, SYMKIND=DV, MDLNAME=PI6C2308A-1HW_Typ, MDLPATH=d:¥Model, PPIN=3, attributes, etc . . .

RV1:X=1888, Y=1648, DIR=0, SYMNAME=RECEIVER, SYMKIND=RV, MDLNAME=SN74LVC08002_Typ, MDLPATH=d:¥Model, PPIN=1, attributes, tc . . .

RV2:X=1888, Y=1752, DIR=0, SYMNAME=RECEIVER, SYMKIND=RV, MDLNAME=SN74LVC08002_Typ, MDLPATH=d:¥Model, PPIN=1, attributes, etc . . . [END BLOCK]net attributes,

[NET]NET1:KIND=CLK, FREQ=50.000, TOPO=ONEV, SKEW=1.000, EDGE=UP, DUTY=0.500, ED GECHKFLAG=ON; [END NET]segment information

[SEGMENT]SEG1:LEN=100.000, WID=100.000, IMP=50.000, DLY=7.000, detailed line characteristic values, etc.

. . . SEG2:LEN=20.000, WID=100.000, IMP=50.000, DLY=7.000, detailed line characteristic values, tc.

. . . SEG3:LEN=5.000, WID-100.000, IMP=50.000, DLY=7.000, detailed line characteristic values, etc.

. . . SEG4:LEN=10.000, WID=100.000, IMP=50.000, DLY=7.000, detailed line characteristic values, etc . . .

[END SEGMENT]terminal point information [NODE]

N1;X=1520, Y=1648, LAY=1, KIND=PIN, BLK=DV1, PIN=01, PPIN=;N2:X=1888, Y=1648, LAY=1, KI ND=PIN, BLK=RV1, PIN=01, PPIN=;N3:X=1888, Y=1752, LAY=1, KIND=PIN, BLK=RV2, PIN=01, PP IN=;N4:X=1760, Y=1752, LAY=1, KIND=DIV;N5: X=1760, Y=1648, LAY=1, KIND=DIV;[END NODE]part information [ELEMENT]

ELM1:KIND=BLK, NAME=DV1, NODE1=N , NODE2=N1, NET=NET1; ELM2:KIND=BLK, NAME=RV1, NODE1=N2, NODE2=N2, NET=NET1; ELM3:KIND=BLK, NAME=R V2, NODE1=N3, NODE2=N3, NET=NET1;ELM4:KIND=SEG, NAME=SEG1, NODE1=N1, NODE2=NS, NET=NET1; ELM5:KIND=SEG, NAME=SEG2, NODE1=N3, NODE2=N4, NET=NET1;ELM6:KIND=SEG, NAME=SEG3, NODE1=N4, NODE2=N5, NET=NE T1;ELM7:KIND=SEG, NAME=SEG4, NODE1=N5, NODE2=N2, NET=NET1;[END ELEMENT][DV-RV]1: DVBLKL=,DVBLK=DV1, DVNODE=N1, RVBLKL=, RVBLK=DV1, RVNODE=N1,

MINDLY=0.000, MAXDLY=10.000, TARGET=OFF;2: DVBLKL=,DVBLK=DV1, DV NODE=N1, RVBLKL=, RVBLK=RV1, RVNODE=N2,

MINDLY=0.000, MAXDLY=10.000, TARGET=ON;3: DVBLKL=, DVBLK=DV1, DVN ODE=N1, RVBLKL=, RVBLK=RV2, RVNODE=N3,

MINDLY=0.000, MAXDLY=10.000, TARGET=ON;4: DVBLKL=,DVBLK=DV1, DVN ODE=N1,RVBLKL=, RVBLK=, RVNODE=N4,

MINDLY=0.000, MAXDLY=10.000, TARGET=OFF;5: DVBLKL=, DVBLK=DV1, DV NODE=N1, RVBLKL=, RVBLK=, RVNODE=N5,

MINDLY=0.000, MAXDLY=10.000, TARGET=OFF; [END DV-RV]analysis condition [ANALYSIS]1: TIME=0.000, STEP=0.000, analysis condition, etc . . . [END ANALYSIS][PAIR][END PAIR]

Figure 4:
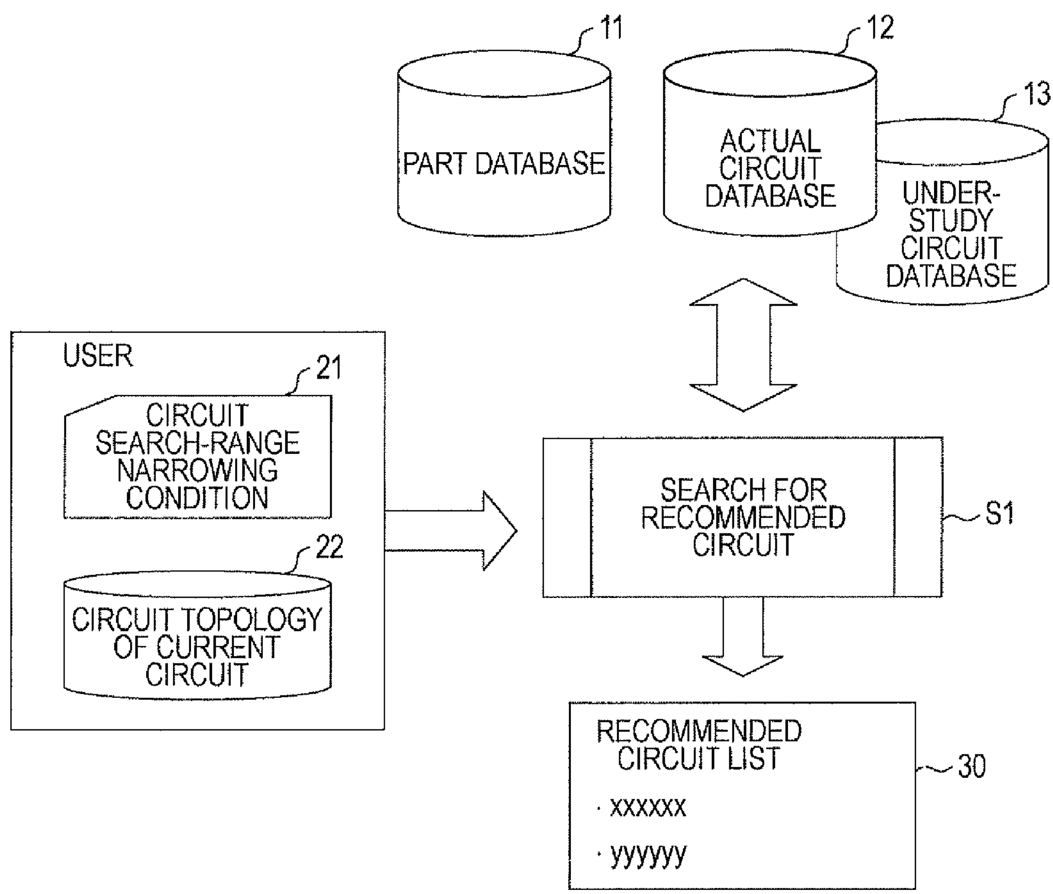
FIG. 4 illustrates an exemplary embodiment.

FIG. 4 illustrates an exemplary embodiment. In a operation S1 that may be executed by the CPU 201 which may serve as a processing unit, when a circuit topology 22 of a current circuit (or an existing circuit) is changed based on a circuit search-range narrowing condition 21 that is input by the user through an input unit, e.g., the keyboard 103, recommended circuits are automatically obtained by searching a database including a part database 11, an actual circuit database 12, and a under-study circuit database 13. A recommended circuit list 30 is displayed on the display screen **102*a* of the display 102**.

The part database 11 stores the items of number of pins (or terminals), pin name, usable frequency band, price, thermal information, part height, weight, multi-vendor information, etc., and it constitutes a library including, e.g., IBIS (I/O Buffer Information Specification). A circuit database includes the actual circuit database 12 regarding circuits which have been used as actual circuits in the past, and the under-study circuit database 13 regarding circuits in the study stage (or under design). Those databases 11 to 13 are stored, for example, by a storage area of the memory unit 202 in the computer system 100 and/or a storage area of the storage medium 106 outside the computer system 100.

The circuit topology 22 of the current circuit can be read from the actual circuit database 12 or the under-study circuit database 13 and input to the computer system 100, or it can be prepared by the user on the computer system 100 for inputting thereto. Alternatively, the circuit topology 22 may be input from an external system.

The circuit search-range narrowing condition 21 includes, for example, at least one of the following conditions c1 to c6. Priority of each of the conditions c1 to c6 included in the circuit search-range narrowing condition 21 may be set in the order in which the conditions c1 to c6 are stated.

It is also possible for the user to optionally designate priority for each of the conditions c1 to c6. An exemplary designation may be:

c1: The driver price is not higher than that of the driver in the current circuit.

c2: There are three types of receivers.

c3: The wiring length up to the farthest end is larger than that in the current circuit by, e.g., +50 mm or more.

c4: The operating frequency is not lower than that in the current circuit.

c5: The termination resistance and the damping resistance are of no significance (namely, they may be present or absent as required).

6: Thermal condition is superior to that in the current circuit.

When the above-described circuit search-range narrowing condition 21 is used, the recommended circuit list 30 is displayed as follows, by way of example, along with the conditions c1 to c6 for each recommended circuit. Namely, recommended circuit 1: price-50, 3 RV, 185 mm, 60 MHz, with damping, and without termination, thermally comparable recommended circuit 2: price-30, 3 RV, 200 mm, 66 MHz, with damping, and with termination, thermally comparable recommended circuit 3: price-10, 3 RV, 200 mm, 50 MHz, without damping, and with termination, etc. Herein, "price-50" may be defined as a that the driver price is 50 arbitrary units, and "thermally comparable" may be defined as a thermal condition is comparable to that of the current circuit.

Figure 5:
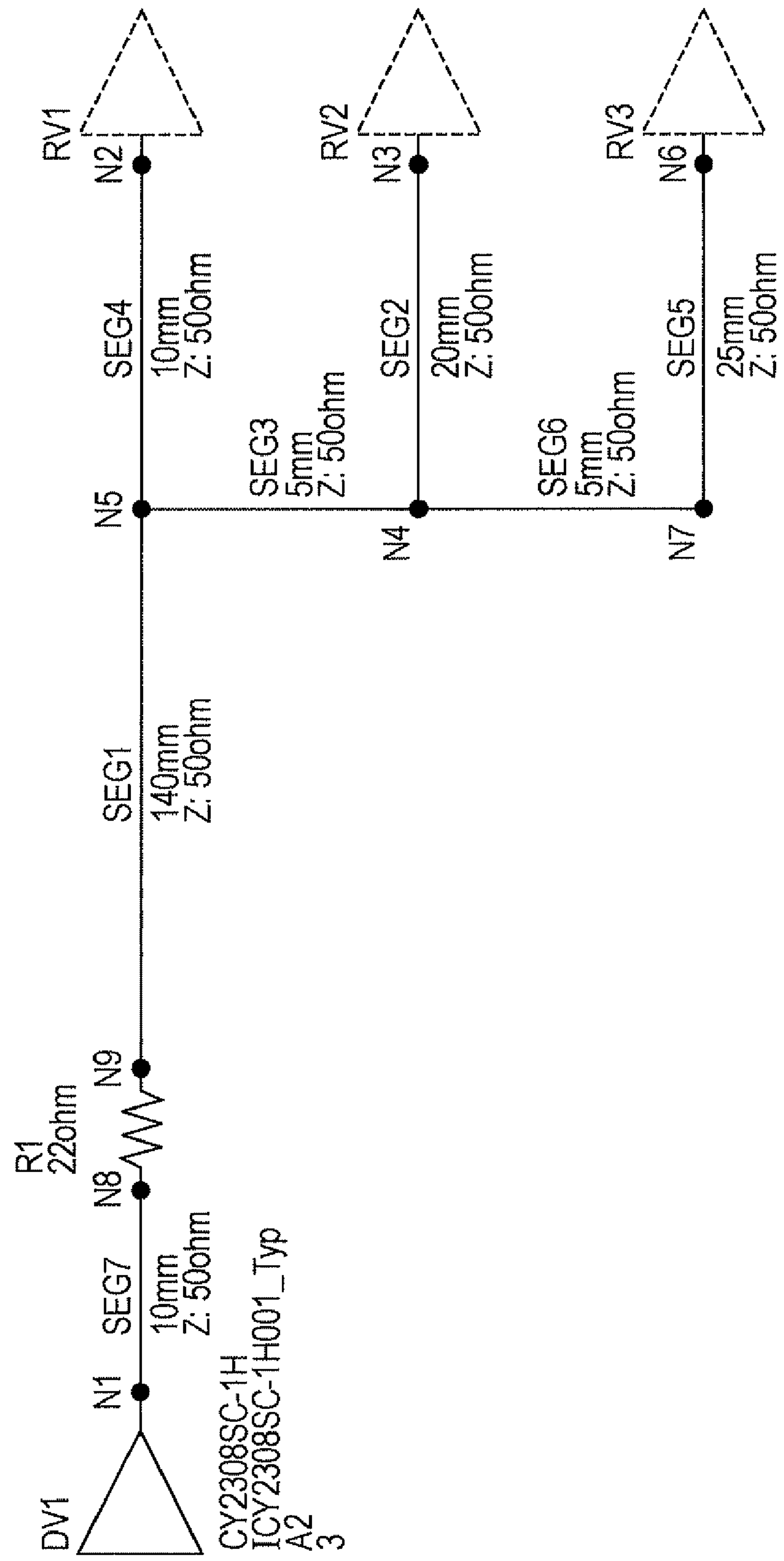
FIG. 5 illustrates an exemplary circuit topology.

As the recommended circuit 1, a circuit configuration (i.e., a circuit topology) shown in FIG. 5, by way of example, is displayed on the display screen 102*a* of the display 102. Note that, in FIG. 5, circuit topology data of the receivers RV1 to RV3 are not shown.

Parts often include the so-called multi-vendor parts which are compatible in pin assignment and have the same functions, but they are supplied from different vendors. In some of the multi-vendor parts, however, those parts greatly differ from one another in drive capability and I/O characteristics, e.g., output impedance, regardless of having the same functions. Thus, when multi-vendor parts A, B, C and D, for example, are usable, there is a possibility that if the part C is used instead of the part A, a trouble may occur; for example, the circuit may fail to normally operate. For that reason, a countermeasure to avoid the above-described drawback has to be taken when the multi-vendor part is used.

In this embodiment, to cope with the above-described problem, various kinds of information, such as performance information including I/O characteristics, are held in the part database 11 per part and per pin. For each part, information indicating that the multi-vendor part has the same function as which one of parts, and information regarding the price, reliability, etc. are stored in the form of a table. For example, characteristics of respective pins of the multi-vendors A, B, C and D are classified and held in a buffer table 600 within the part database 11. FIG. 6 illustrates one example of the buffer table 600. The buffer table 600, shown in FIG. 6, stores the drive capability, the output impedance, and a ratio tr/tf of a signal rise time tr to a signal fall time tf for each pin of the parts A to D.

For example, when the current circuit employs the part C and the user determines based on the analysis result of the current circuit that a change of the circuit topology of the current circuit is not required, a recommended circuit can be chosen by selecting, from the buffer table 600, the multi-vendor part that is comparable in capability and superior in price and reliability to the part C. On the other hand, when the user determines the presence of some problem based on the analysis result, the user determines whether the problem can be overcome by changing the part C. That determination is made in such a manner as not analyzing those parts which will apparently not become candidates, judging from the analysis result, instead of analyzing all of many parts. When another part is selected as a candidate to be substituted for the part C, determination for the selection can be performed at a high speed by varying a threshold, which is employed as a criterion for the determination, depending on, e.g., the impedance (or the error) of a substrate used.

Assuming, for example, the case where it is determined from the analysis result of the current circuit using the part C that the ratio tr/tf needs to be 0.2 ns or more, only the parts A and B are selected as candidates to be substituted for the part C, while the part D is excluded from the candidates. Further, taking into account other conditions such as the price and the actual performance in use, the partA or B is selected as a recommended part. In addition, an analysis of the part A or B is performed, as required, to confirm that there is no problem. Thus, an appropriate part can be selected at a high speed.

By selecting a multi-vendor part which is susceptible to less errors than the part used in the current circuit and which provides the actual performance in use in the latest days, the part selection can be performed in match with a trend at that time. Also, by limiting the part, which is to be taken into consideration, to only a buffer, for example, when a method of revising a failure of the signal waveform at some pin is searched for, an appropriate revision method can be obtained with a corresponding reduction in a quantity of computing process required to search for the revision method.

Further, by presenting, to the users one or more part candidates or recommended parts which are usable instead of some part, even those users who are not so acquainted with parts can also easily perform circuit design, and they can deepen knowledge of the parts based on the presented parts.

Figure 8:
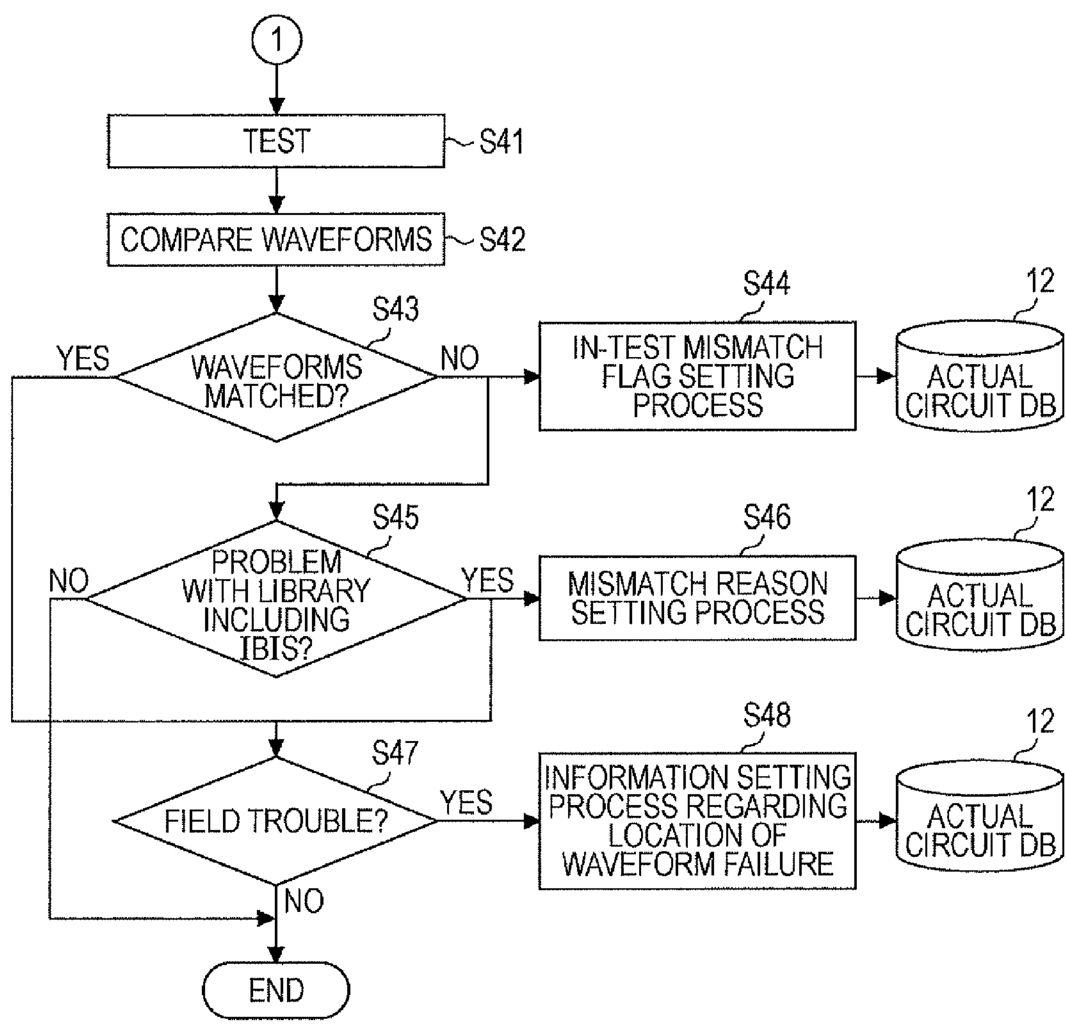
FIG. 8 illustrates the data registering process.

FIGS. 7 and 8 illustrate a process of registering data in the database. The data registering process may be executed by the CPU 201.

Referring to FIG. 7, in operation S11, the CPU 201 executes a circuit design process, including selection of parts used in a circuit to be designed, in response to instructions that are input by the user through, e.g., the keyboard 103 while looking at views on the display screen 102*a* of the display 102. In operation S12, the CPU 201 executes a waveform analysis process for analyzing a signal waveform at a desired pin or node with respect to the result of the circuit design process, and displays the result of the waveform analysis process on the display screen 102*a* of the display 102. In other words, when executing operation S12, the CPU 201 functions as an analysis unit for executing the waveform analysis process. If the waveform analysis process in operation S12 is not completed, the CPU 201 executes, in operation S13, a mounting design process, including mounting of the selected parts, in response to instructions that are input by the user through, e.g., the keyboard 103 while looking at views on the display screen 102*a* of the display 102.

In operation S14, the CPU 201 executes a waveform analysis process for analyzing a signal waveform at a desired pin or node with respect to the result of the mounting design process, and displays the result of the waveform analysis process on the display screen 102*a* of the display 102. If the waveform analysis process in operation S14 is not completed, the processing advances to operation S15. In operation S15, the CPU 201 executes an AW (ArtWork) process and determines whether the result of the AW process is stored as actual circuit database.

If the result of the determination in operation S15 is "YES", the processing advances to later-described operation ST2 and to later-described operation S41 in FIG. 8.

If the result of the determination in operation S12 or S14 is "YES", the processing advances to operation ST1. In operation ST1 made up of operations S21 to S35, the CPU 201 executes a data storing process to the under-study circuit database 13. More specifically, in operation S21, the CPU 201 determines whether there is a problem (NG) in the analysis result of the waveform analysis process. If the result of the determination in operation S21 is "NO", the processing advances to later-described operation S35. If the result of the determination in operation S21 is "YES", the CPU 201 determines in operation S26 whether the net type of the circuit to be designed is the data- or edge-based type.

Upon the data-based type, the CPU 201 determines in operation S22 whether the analysis result includes a timing failure. If the signal timing is not within an allowable range, the timing failure is detected. If the result of the determination in operation S22 is "YES", a timing failure flag is set in operation S23 for the circuit to be designed. If the result of the determination in operation S22 is "NO" or after operation S23, the CPU 201 determines in operation S24 whether the analysis result includes an amplitude problem (NG). If the signal amplitude is not within an allowable range, the amplitude problem is detected. If the result of the determination in operation S24 is "YES", an amplitude problem flag is set in operation S25 for the circuit to be designed. If the result of the determination in operation S24 is "NO" or after operation S25, the processing advances to operation S35.

Upon the edge-based type, the CPU 201 determines in operation S27 whether the analysis result includes a waveform split. If the signal waveform includes, e.g., a stepped waveform and is not within an allowable shape range, the waveform split is detected. If the result of the determination in operation S27 is "YES", a waveform split flag is set in operation S28 for the circuit to be designed. If the result of the determination in operation S27 is "NO" or after operation S28, the CPU 201 determines in operation S29 whether the analysis result includes an OS (OverShoot) or an US (UnderShoot). If the signal waveform has the OS or the US in excess of an allowable range, the OS or the US is detected. If the result of the determination in operation S29 is "YES", an OS or US flag is set in operation S30 for the circuit to be designed. If the result of the determination in operation S29 is "NO" or after operation S30, the CPU 201 determines in operation S31 whether the analysis result includes an amplitude problem (NG). If the signal amplitude is not within an allowable range, the amplitude problem is detected. If the result of the determination in operation S31 is "YES", an amplitude problem flag is set in operation S32 for the circuit to be designed. If the result of the determination in operation S31 is "NO" or after operation S32, the CPU 201 determines in operation S33 whether a reference is satisfied. If the signal does not satisfy any reference such as not rising in a desired time, a below-reference problem is detected. If the result of the determination in operation S33 is "YES", a below-reference flag is set in operation S34 for the circuit to be designed. If the result of the determination in operation S33 is "NO" or after operation S34, the processing advances to operation S35.

The flags set in operations S23, S25, S28, S30 and S34 are set for the circuit to be designed (under-study circuit) which is stored in the under-study circuit database 13. Accordingly, the user can confirm the presence or absence of various troubles and the situations of those troubles by referring to those set flags.

In operation S35, the CPU 201 executes a process of decomposing the circuit topology of the circuit to be designed and automatically rearranging the analysis conditions, and then stores, in the under-study circuit database 13, rearranged data regarding the circuit to be designed. The data rearranged in operation S35 includes data regarding the part, line length, via, branch, operating frequency, impedance, temperature, etc.

In operation ST2, a process of storing data in the actual circuit database 12 may be executed as in operation ST1, and an AW flag is set for the actual circuit. The AW flag is set for the actual circuit stored in the actual circuit database 12.

Referring to FIG. 8, the CPU 201 executes a test of the actual circuit in operation S41 and compares, in operation S42, a signal waveform (measured value) of the tested actual circuit with a signal waveform (analysis value) set in design. In operation S43, the CPU 201 determines whether the compared signal waveforms are matched with each other. If the result of the determination in operation S43 is "NO", the processing advances to operation S44 and S45. In operation S44, a flag indicating a mismatch of the signal waveform in the test is set for the actual circuit stored in the actual circuit database 12. If the result of the determination in operation S43 is "YES", the processing advances to later-described operation S47. In operation S45, the CPU 201 determines whether there is a problem with a library including IBIS, for example, which is constituted by the part database 11. If the result of the determination in operation S45 is "YES", the processing advances to operation S46 and S47. In operation S46, the reason causing the problem attributable to the library is set for the actual circuit stored in the actual circuit database 12. If the result of the determination in operation S45 is "NO", the processing is brought to an end. In operation S47, the CPU 201 determines whether there is a field trouble. If the result of the determination in operation S47 is "YES", information of a field trouble is set in operation S48 for the actual circuit stored in the actual circuit database 12. If the result of the determination in operation S47 is "NO", the processing is brought to an end. Accordingly, the user can determine the risk by referring to the flag, the reason causing the problem, and the trouble information, which have been set as described above.

Figure 10:
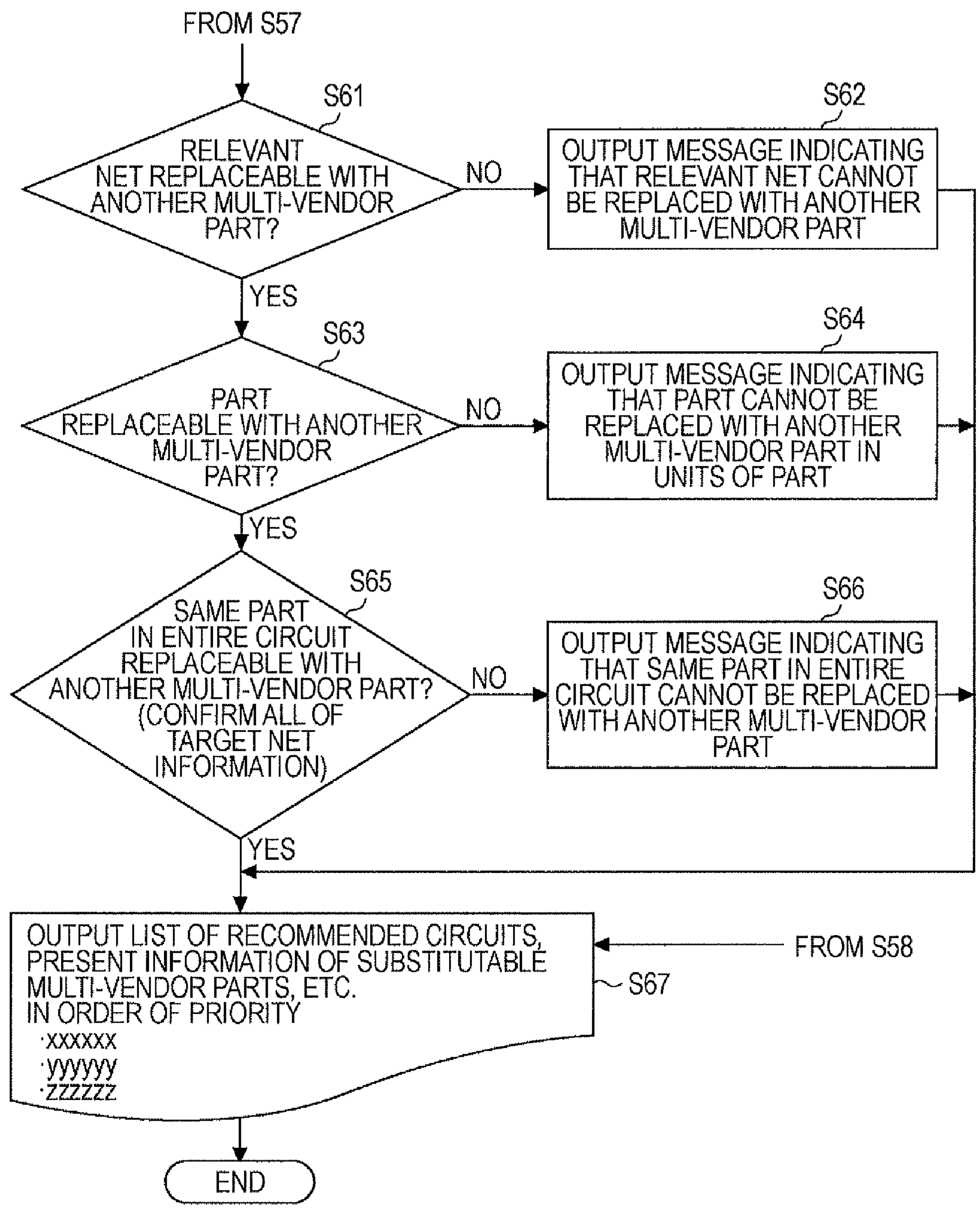
FIG. 10 illustrates a circuit design process including the data referring process.

FIGS. 9 and 10 illustrate a circuit design process including a data referring process to the databases. The circuit design process including the data referring process may be executed CPU 201.

Referring to FIG. 9, in operation S51, the CPU 201 forms the circuit topology of the current circuit to be redesigned and executes a waveform analysis in response to instructions that are input by the user through, e.g., the keyboard 103 while looking at views on the display screen 102*a* of the display 102. In operation S52, the CPU 201 executes a process of decomposing the circuit topology of the current circuit and automatically rearranging the analysis conditions. The data rearranged in operation S52 includes data regarding the part, line length, via, branch, operating frequency, impedance, temperature, etc. In operation S53, the CPU 201 determines whether there is actual performance for the same circuit topology as that of the current circuit. If the result of the determination in operation S53 is "NO", an alarm message indicating no actual performance is displayed on the display screen 102*a* of the display 102 in operation S54, and the processing advances to later-described operation S56.

If the result of the determination in operation S53 is "YES", the CPU 201 searches, in operation S55, the actual circuit database 12 and the under-study circuit database 13 to find recommended circuits when the circuit topology of the current circuit is changed based on the circuit search-range narrowing condition that is input by the user through the input unit, e.g., the keyboard 103. The circuit search-range narrowing condition input at that time includes at least one of the total line length, operating frequency, number of receivers, number of resistances, number of vias, impedance, number of connectors, number of branches, temperature, etc. Further, the circuit search-range narrowing condition may include at least one of the price of a part such as a driver, number of types of parts such as receivers, wiring length up to the farthest end, operating frequency, termination resistance, damping resistance, thermal condition, etc.

In operation S56, the recommended circuits having been narrowed down in operation S55 based on the circuit search-range narrowing condition are further narrowed down based on a part search-range narrowing condition that is read from the part database 11. In the illustrated example, the part search-range condition includes multi-vendor information and contains conditions such as cost reduction, heat generation or heat resistance, weight, part height, and each pin/buffer table. Which one(s) of those conditions, e.g., cost reduction, is selected or given with priority may be designated by the user or predetermined in advance by default.

In operation S57, the CPU 201 determines whether there is a multi-vendor part. If the result of the determination in operation S57 is "NO", a message indicating no multi-vendor part is displayed on the display screen 102*a* of the display 102 in operation S58, and the processing advances to operation S67 later described with reference to FIG. 10. If the result of the determination in operation S57 is "YES", the processing advances to operation S61 shown in FIG. 10.

Referring to FIG. 10, in operation S61, the CPU 201 determines whether the relevant net can be replaced with another multi-vendor part. If the result of the determination in operation S61 is "NO", a message indicating that the relevant net cannot be replaced with another multi-vendor part is displayed in operation S62 on the display screen 102*a* of the display 102, and the processing advances to later-described operation S67. If the result of the determination in operation S61 is "YES", the CPU 201 determines in operation S63 whether the part can be replaced with another multi-vendor part. If the result of the determination in operation S63 is "NO", a message indicating that the part cannot be replaced with another multi-vendor part in units of part is displayed in operation S64 on the display screen 102*a* of the display 102, and the processing advances to later-described operation S67.

In operation S65, the CPU 201 determines whether the same part in the entire current circuit can be replaced with another multi-vendor part. If the result of the determination in operation S65 is "NO", a message indicating that the same part in the entire current circuit cannot be replaced with another multi-vendor part is displayed in operation S66 on the display screen 102*a* of the display 102, and the processing advances to operation S67. In operation S67, a list of the recommended circuits is displayed on the display screen 102*a* of the display 102, and the processing is brought to an end. The list of the recommended circuits contains, e.g., information of the substitutable multi-vendor parts in the order of priority.

The part database 11 includes a part table 1100 shown in FIG. 11, a part pin table 1200 shown in FIG. 12, and a part buffer table 1300 shown in FIG. 13.

The part table 1100 stores, for each part, the items of representative specification name, maker model name, maker product name, number of pins, part rank based on part evaluation in total, failure rate, RoHS, heat resistance rank, price, heat generation rank, package shape, part height, operating life, part weight, moisture absorption control, etc.

The part pin table 1200 stores the buffer name and the package (PKG) capacity for each pin (pin number) in each part.

The part buffer table 1300 is similar to the buffer table 600 shown in FIG. 6. In one example shown in FIG. 13, the part buffer table 1300 stores, for each part buffer (buffer name), the drive capability, the output impedance, the ratio tr/tf of the signal rise time tr to the signal fall time tf, and the input clamp. In FIG. 13, GND indicates that the clamp is located on the Low side, and PWR indicates that the clamp is located on the High side.

When an error is detected in any part of the current circuit as the result of analyzing the current circuit, a search is desirably started from the multi-vendor part if the relevant part can be changed to anther one. A description is made below in connection with the case of studying changeable parts, by way of example, based on the following representative types E1 to E4 of the waveform error. E1: a waveform split that is a critical error in the edge-operating net. E2: ringing due to, e.g., EMI (Electromagnetic Interference), fluctuations of the ground, etc. E3: an overshoot (OS) or an undershoot (US) due to, e.g., breakage of the part, EMI, etc. E4: a timing failure due to malfunction.

Assuming, for example, that the above-mentioned error E1 occurs in an output net of the pin number 1 when the current circuit uses a multi-vendor part of the maker model name CCC, a buffer which is considered to be optimum to cope with the error at the same pin number 1 of the multi-vendor part is automatically selected and presented as a recommended candidate. If there are one or more other candidates, those candidates are also presented along with indication of priority. At that time, the buffers presented as the recommended candidates can be automatically selected by referring, based on a buffer table 1400 of the maker model name CCC shown in FIG. 14, a buffer table 1500 of the maker model name AAA shown in FIG. 15, a buffer table 1600 of the maker model name BBB shown in FIG. 16, a buffer table 1700 of the maker model name DDD shown in FIG. 17, etc. In FIGS. 14 to 17, Ccomp represents the capacity of a silicon die at a pin 4 of the buffer name Input1.

FIG. 18 illustrates processing executed on an analysis result. In other words, a principal part of the processing in operation ST1 or ST2 of FIG. 7 will be described in more detail with reference to FIG. 18. Note that the processing of FIG. 18 may be executed by the CPU 201.

Referring to FIG. 18, in operation S71, the CPU 201 executes a waveform analysis of the designed circuit, e.g., the current circuit in operation ST1. In operation S72, the CPU 201 determines a result of the waveform analysis. Determining the result of the waveform analysis can be performed by any of the well-known methods. In operation S73, the CPU 201 determines whether there is an error with the result of the waveform analysis. If the result of the determination in operation S73 is "NO", the processing advances to later-described operation S82. On the other hand, if the result of the determination in operation S73 is "YES", the processing advances to operation S74.

In operation S74, the CPU 201 determines whether there is a waveform split. If the result of the determination in operation S74 is "YES", the circuit topology is automatically changed in operation S75, for example, by enhancing the driver capability, adding or increasing the damping resistance, or moving the near-end receiver to a farther position in order to prevent the waveform split. If the result of the determination in operation S74 is "NO" or after operation S75, the CPU 201 determines in operation S76 whether there is an amplitude error.

If the result of the determination in operation S76 is "YES", the circuit topology is automatically changed in operation S77, for example, by confirming an error in voltage setting of the driver used, changing the pull-up or pull-down voltage, or replacing the buffer with another one having a more appropriate output impedance in order to prevent the amplitude error. If the result of the determination in operation S76 is "NO" or after operation S77, the CPU 201 determines in operation S78 whether there is an OS or an US.

If the result of the determination in operation S78 is "YES", the circuit topology is automatically changed in operation S79, for example, by replacing the buffer with another one having a more appropriate output impedance, replacing the receiver with another one having a clamp, or attaching a termination resistance in order to prevent the OS or the US. If the result of the determination in operation S78 is "NO" or after operation S79, the CPU 201 determines in operation 80 whether the signal waveform rises in a desired time.

If the result of the determination in operation S80 is "NO", the circuit topology is automatically changed in operation S81, for example, by replacing the driver with another one having a higher operating speed, moving the near-end receiver to a farther position, or moving the farthest-end receiver to a nearer position in order that the signal waveform rises in the desired time. If the result of the determination in operation S80 is "YES" or after operation S81 the CPU 201 determines in operation S82 whether there is a cheaper or more reliable part.

If the result of the determination in operation S82 is "YES", the cheaper part, the more reliable part, the part having a lower part height, the part generating less heat, etc. are automatically selected in operation S83 in the order of priority, if the priority is set, from among buffers having the drive capability comparable to that of the buffer used. If the result of the determination in operation S82 is "NO" or after operation S83, the processing is brought to an end.

By including date information in the data stored in the databases, the user can grasp, e.g., the recent trends of the circuit topology and the parts which are to be used. Also, by including, in the data, information regarding the number of times each part has been used in circuit designs, the user can grasp the trend in design. Further, by including user information in the data, it is possible to grasp the trend (or knowhow) in design made by each user.

According to an exemplary embodiment, upon designating a part or a pin used in, e.g., a circuit which is to be designed with the topology of the current circuit, data regarding the past circuit designs having the same or similar circuit topology as or to the circuit to be designed can be automatically displayed. Also, based on the data regarding the current circuit and the registered past circuit designs, the analysis result of the current circuit, including the presence or absence of a trouble and the situation of the trouble, can be automatically compared with the analysis results of circuits designed in the past. Therefore, the user can easily confirm the analysis results, including the trend of the circuit topology, the trend in combination of parts, and the situations of troubles.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc—Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A computer aided design system comprising:

an input unit inputting a circuit search-range narrowing condition; and a processing unit, when a circuit topology of a circuit to be designed is changed, finding recommended circuits by searching a database, which stores part data and circuit data, based on the circuit search-range narrowing condition, and outputting a list of the recommended circuits, wherein the database comprises a part database storing part data including the number of pins, pin name, usable frequency band, price, thermal information, part height, weight, and multi-vendor information, an actual circuit database storing circuit data regarding circuits which have been used as actual circuits in the past, and an under-study circuit database storing circuit data regarding circuits in a study stage.

2. The computer aided design system according to claim 1, wherein the circuit search-range narrowing condition includes at least one of the price of a part, number of types of parts, wiring length up to a farthest end, operating frequency, termination resistance, damping resistance, thermal condition, total line length, number of receivers, number of resistances, number of vias, impedance, number of connectors, number of branches, and temperature.

3. The computer aided design system according to claim 2, wherein, after narrowing down the recommended circuits based on the circuit search-range narrowing condition, the processing unit further narrows down the recommended circuits based on multi-vendor information stored in the part database.

4. The computer aided design system according to claim 1, wherein the list of the recommended circuits includes at least one of the price of a part, number of types of parts, wiring length up to a farthest end, operating frequency, termination resistance, damping resistance, and thermal condition.

5. The computer aided design system according to claim 1, further comprising:

an analysis unit comparing an analysis result of analyzing the circuit to be designed with an analysis result of a circuit designed in the past, which is stored in the database.

6. The computer aided design system according to claim 5, wherein the analysis result includes the presence or absence of a trouble and the situation of the trouble, and the analysis unit displays the analysis result on the display.

7. The computer aided design system according to claim 1, further comprising:

an update unit automatically updating the actual circuit database.

8. A computer-readable storage device encoded with a computer program that causes a computer to execute processing for aiding a circuit design comprising:

inputting a circuit search-range narrowing condition;

when a circuit topology of a circuit to be designed is changed, finding recommended circuits by searching a database, which stores part data and circuit data, based on the circuit search-range narrowing condition; and outputting a list of the recommended circuits, wherein the database comprises a part database storing part data including the number of pins, pin names, usable frequency bands, prices, thermal information, part heights, weights, and multi-vendor information, an actual circuit database storing circuit data regarding circuits which have been used as actual circuits in the past, and an under-study circuit database storing circuit data regarding circuits in a study stage.

9. The computer-readable storage device according to claim 8, wherein the circuit search-range narrowing condition includes at least one of the price of a part, number of types of parts, wiring length up to a farthest end, operating frequency, termination resistance, damping resistance, thermal condition, total line length, number of receivers, number of resistances, number of vias, impedance, number of connectors, number of branches, and temperature.

10. The computer-readable storage device according to claim 9, wherein, after narrowing down the recommended circuits based on the circuit search-range narrowing condition, the processing unit further narrows down the recommended circuits based on multi-vendor information stored in the part database.

11. The computer-readable storage device according to claim 8, wherein the list of the recommended circuits includes at least one of the price of a part, number of types of parts, wiring length up to a farthest end, operating frequency, termination resistance, damping resistance, and thermal condition.

12. The computer-readable storage device according to claim 8, wherein the circuit design further comprises:

comparing an analysis result of analyzing the circuit to be designed with an analysis result of a circuit designed in the past, which is stored in the database.

13. The computer-readable storage device according to claim 12, wherein the analysis result includes the presence or absence of a trouble and the situation of the trouble, and the analysis result is output.

14. The computer-readable storage device according to claim 8, wherein the circuit design further comprises:

automatically updating the actual circuit database.

* * * * *